United States Patent
Ban

Patent Number: 5,684,914
Date of Patent: Nov. 4, 1997

[54] DIGITAL CARRIER GENERATOR FOR FREQUENCY BAND CONVERSION OF COLOR SIGNALS

[75] Inventor: Young-gyun Ban, Seoul, Rep. of Korea

[73] Assignee: Samsung Electronics Co., Ltd., Kyungki-Do, Rep. of Korea

[21] Appl. No.: 291,862

[22] Filed: Aug. 17, 1994

[30] Foreign Application Priority Data

Aug. 18, 1993 [KR] Rep. of Korea ............ 93-16003

[51] Int. Cl.⁶ ................................................ H04N 9/80
[52] U.S. Cl. .......................... 386/26; 386/40; 386/41
[58] Field of Search .............................. 358/323, 324, 358/325, 326, 320, 327; 348/505, 549, 536, 539; 386/1, 26, 28, 41, 44, 45; H04N 9/80

[56] References Cited

U.S. PATENT DOCUMENTS

| | | | |
|---|---|---|---|
| 4,318,119 | 3/1982 | Tatsuzawa | 358/327 |
| 4,706,110 | 11/1987 | Richter | 348/509 |
| 4,851,928 | 7/1989 | Nakamura et al. | 358/330 |
| 5,057,796 | 10/1991 | Winterer | 386/26 |
| 5,247,543 | 9/1993 | Tsuda et al. | 375/97 |
| 5,267,040 | 11/1993 | Gossett | 348/500 |
| 5,355,171 | 10/1994 | Miyazaki et al. | 348/505 |
| 5,396,294 | 3/1995 | Fujii et al. | 386/26 |
| 5,406,335 | 4/1995 | Nikoh | 348/642 |
| 5,459,524 | 10/1995 | Cooper | 348/507 |

FOREIGN PATENT DOCUMENTS 2179521  8/1986  United Kingdom ............ H04N 9/78

Primary Examiner—Tommy P. Chin
Assistant Examiner—Y. Lee
Attorney, Agent, or Firm—Sughrue,Mion,Zinn,Macpeak & Seas, PLLC

[57] ABSTRACT

An apparatus for generating a carrier frequency suitable for frequency band conversion of a color signal in a digital color signal processing circuit of a video tape recorder includes an adder, an integrator and a memory device. The adder combines a first phase variation amount signal, which can be obtained with respect to a change in a horizontal sync signal, to a second phase variation amount signal, which can be obtained with respect to a change in a color burst signal. The integrator integrates the resultant phase variation amount signal, and generates a phase value signal. The memory, which in an exemplary case can be a read only memory (ROM), then provides a carrier signal corresponding to the phase value signal output by the integrator. Thus, the required carrier for digital processing of the color signal can be generated using a simpler structure., e.g., without the use of a multiplier and a band-pass filter.

10 Claims, 1 Drawing Sheet

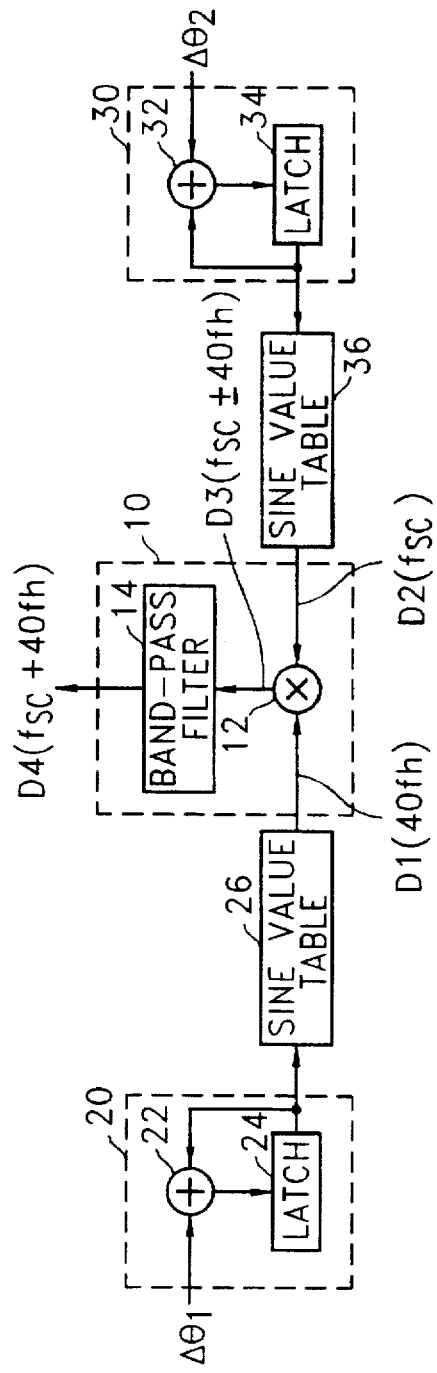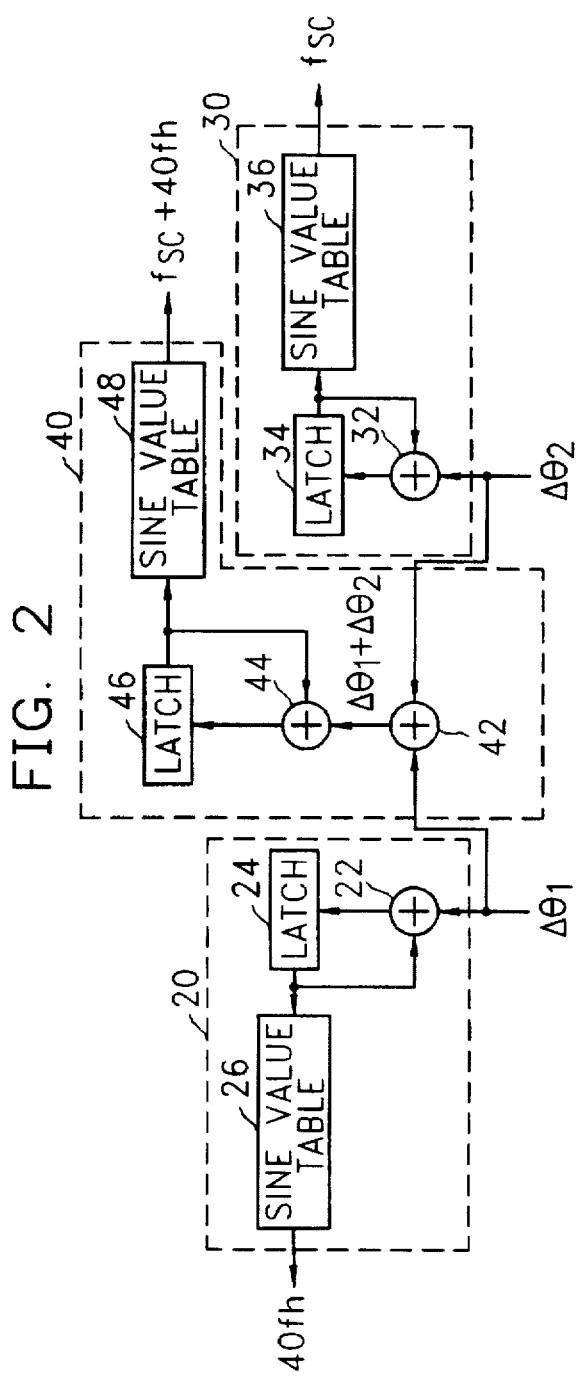

DIGITAL CARRIER GENERATOR FOR FREQUENCY BAND CONVERSION OF COLOR SIGNALS

BACKGROUND OF THE INVENTION

1. Field of the Invention

The present invention relates to a carrier generator which is used for recording and/or reproducing a color signal. More specifically, the present invention relates to a carrier generating apparatus for frequency band conversion of a digital color signal in order to record and/or reproduce a color signal associated with a composite color television signal.

The instant application is based on Korean Patent Application No. 93-16003, which is incorporated herein by reference for all purposes.

2. Discussion of Related Art

The frequency band of an actually transmitted color signal is different from that of a color signal which is recorded on tape in a color video tape recorder. Thus, a color signal frequency band conversion circuit is needed to perform a color signal frequency band conversion during recording or restoring operations associated with the color signal. One reference disclosing signal frequency band conversion is U.S. Pat. No. 4,851,928 to Numakura et al. It will be noted that a carrier signal which is generated by a carrier generator is used in color signal frequency band conversion.

It will also be noted that the signal processing method of choice for use with color video tape recorders has recently changed from an analog method to a digital method. When an existing analog method algorithm is used for processing the color signal by digital processing, the resultant output volume of the associated circuit becomes too large.

In attempting to solve the above-identified problem, U.K. Patent Laid-Open Publication No. 2,179,521 A to Suzuki, which was published on Apr. 4, 1987, discloses a color signal demodulation apparatus in which a low-pass filter is not necessary for demodulating the color signal.

Prior to describing a digital carrier generator, a center frequency of a color signal during recording and/or reproducing with respect to an NTSC standard will be described immediately below.

A subcarrier of a transmitted color signal has a center frequency of 629 KHz, i.e., 40 $f_h$, where $f_h$ represents a horizontal sync frequency. In an exemplary case addressing 8 mm format recording, the center frequency of the color signal becomes 743 KHz, i.e., 47.25 $f_h$. It will be noted that the assumed center frequency of the color signal during recording is 629 KHz, i.e., 40 $f_h$. During the recording of the color signal, a color subcarrier frequency $f_{sc}$ becomes 40 $f_h$ for a low-band conversion, while during reproducing the frequency of 40 $f_h$ is restored to the frequency of $f_{sc}$. For such band conversion, a signal processor multiplies a frequency $f_{sc}$ or 40 $f_h$ by a carrier frequency of $f_{sc}+40\ f_h$, to thereby selectively obtain a frequency 40 $f_h$ or $f_{sc}$ using a band-pass filter.

FIG. 1 shows a conventional band conversion carrier generator 10, which 10 includes a multiplier 12 and a band-pass filter 14. Band conversion carrier generator 10 receives a signal D1 (40 $f_h$) which is generated by an integrator 20 and a sine value table 26, and a signal D2 ($f_{sc}$) which is generated by an integrator 30 and sine value table 36.

Multiplier 12 in band conversion carrier generator 10 multiplies signals D1 (40 $f_h$) and D2 ($f_{sc}$) supplied from sine tables 26 and 36 by each other, and generates a carrier signal D3 ($f_{sc} \pm 40\ f_h$) having a frequency band of $f_{sc} \pm 40\ f_h$. Band-pass filter 14 receives a carrier signal output from multiplier 12, removes the $-40\ f_h$ component therefrom and outputs a carrier signal D4 ($f_{sc}+40\ f_h$) having a frequency band of $f_{sc}+40\ f_h$.

One of the circuits which prevents optimal compactness of the circuitry used in processing the color signal according to a digital mode of operation is a carrier generator for generating the carrier signal needed for converting one frequency band of the color signal to another frequency band. From the discussion immediately above, it will be noted that the conventional carrier generator 10 requires a multiplier 12 for obtaining a frequency of $f_{sc} \pm 40\ f_h$, which is used for recording and/or reproducing of the color signal, and a band-pass filter 14 for removing an unnecessary $-40\ f_h$ signal component from the output from multiplier 12. Accordingly, since the multiplier and band-pass filter are limiting with respect to size of the frequency generator, the magnitude, e.g., surface area or volume occupied by the circuit, cannot be significantly reduced.

SUMMARY OF THE INVENTION

The principal object of the present invention is to solve the above-identified problem associated with the circuitry employed in generating a needed carrier signal for color signal band conversion.

Accordingly, one object of the present invention is to provide a carrier generator for producing a predetermined carrier frequency band without employing a multiplier and a band-pass filter. According to one aspect of the invention, the predetermined carrier frequency band is $f_{sc}+40\ f_h$.

Another object of the present invention is to provide a carrier generator producing a predetermined carrier frequency band which is optimally compact.

These and other objects, features and advantages according to the present invention are provided by a carrier generator for generating a digital carrier for a color signal frequency band conversion for use in a video tape recorder. The carrier generator according to the present invention includes:

a first adder for adding a first phase variation amount signal, which can be obtained from a change in a horizontal sync signal, to a second phase variation amount signal, which can be obtained from a change in a color burst signal to thereby produce an added phase variation amount signal;

an integrator for integrating the added phase variation amount signal, and for generating a phase value signal; and a ROM for outputting a carrier signal corresponding to a phase value signal output from the integrator.

BRIEF DESCRIPTION OF THE DRAWINGS

The preferred embodiment is described with reference to the drawings in which like elements are denoted by like or similar numbers and in which:

FIG. 1 is a high level block diagram showing a conventional carrier generator for band conversion; and FIG. 2 is a high level block diagram showing a carrier generator for band conversion according to a preferred embodiment of the present invention.

DETAILED DESCRIPTION OF THE PREFERRED EMBODIMENT

A preferred embodiment of the present invention will be described below in more detail with reference to the accompanying drawing.

In FIG. 2, a carrier generator 40 includes a first adder 42, a second adder 44, a latch 46, and a sine value table 48. Preferably, the sine value table 48 is embodied as a memory device which advantageously can be a read only memory (ROM). Integrators 20 and 30, which are shown in FIG. 2 together with carrier generator 40 are similar to those of FIG. 1 in structure and operation. Thus, further detailed description of these elements will be omitted in the interest of brevity.

Adder 22 receives a first phase variation amount signal $\Delta\theta_1$, e.g., $(40 f_h/27 \text{ MHZ})\times 360°$. Adder 22, in conjunction with latch 24 and sync value 26, generates a frequency of 40 $f_h$. For an exemplary case regarding NTSC standard signals, the unit size for the first phase variation amount signal $\Delta\theta_1$ is approximately $8.387°$. It will be appreciated that size of first phase variation amount signal $\Delta\theta_1$ increases or decreases slightly according to the variation of the horizontal sync signal by an automatic frequency controller (AFC), which is not shown in FIG. 2. According to the first phase variation amount signal $\Delta\theta_1$, forty carriers, each having a respectively different period, can be generated for a horizontal scanning period. It will be appreciated that, in an exemplary case, the first phase variation amount signal $\Delta\theta_1$, represents the phase, difference between adjacent horizontal sync signals.

Second phase variation amount signal $\Delta\theta_2$ is generated by an automatic phase controller (APC), which is also not shown in FIG. 2, in correspondence with a change in a color burst signal. It will be appreciated that adder 32 sequentially adds the currently input second phase variation amount signal $\Delta\theta_2$ to a preceding second phase variation amount signal $\Delta\theta_2$. The adder 32 and the latch 34 then integrate the second phase variation amount signal. Then, sine value table 36 receives the integrated second phase variation amount signal and generates a signal having a frequency of $f_{sc}$, which signal is synchronized in phase with the color burst signal. Similarly, for the exemplary case where a main system clock is 27 MHz, a unit size of second phase variation amount signal $\Delta\theta_2$ is $(f_{sc}/27 \text{ MHz})\times 360°$ which is about $47.73°$. It will be appreciated that, in an exemplary case, the second first phase variation amount signal $\Delta\theta_2$, represents the phase difference between adjacent color subcarrier signals.

A first adder 42 adds the first and second phase variation amount signals $\Delta\theta_1$ and $\Delta\theta_2$. The added phase variation amount $\Delta\theta_1+\Delta\theta_2$ output from the first adder 42 is integrated by second adder 44 and latch 46. The phase value which is obtained by integration is output through latch 46 and is subsequently applied to sine value table 48. Sine value table 48 outputs a sine function value corresponding to an input phase value. Preferably, sine value table 48 outputs a carrier signal having a frequency of $f_{sc}+40 f_h$. The carrier signal advantageously can be used for frequency band conversion of the color signal.

As described above, compared with the FIG. 1 apparatus, the conversion carrier generator shown in FIG. 2 uses first and second phase variation amount signals $\Delta\theta_1+\Delta\theta_2$ as input data, instead of using frequencies of 40 $f_h$ and $f_{sc}$ respectively obtained from integrators and sine value tables. It will be appreciated that the FIG. 2 apparatus, which uses the adder and the latch instead of a multiplier and a band-pass filter, has a much simpler structure than that of the conventional conversion carrier generator.

The above-described embodiment of the present invention can be applied to a PAL standard television signal as well as the NTSC standard television signal. Advantageously, the present invention can be used to facilitate color signal recording and/or reproducing in both a video tape recorder and a camcorder.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A carrier generator for generating a digital carrier associated with a color signal frequency band conversion circuit provided in a video tape recorder, said carrier generator comprising:

a first adder for combining a first phase variation amount signal, which represents a change in a horizontal sync signal, to a second phase variation amount signal, which represents a change in a color burst signal, to thereby produce an added phase variation amount signal;

an integrator for integrating said added phase variation amount signal, and for generating a phase value signal based on said added phase variation amount signal integrated by said integrator; and a memory receiving said phase value signal for outputting a carrier signal;

wherein said first adder is not included within said integrator.

2. The carrier generator according to claim 1, wherein said first phase variation amount signal represents a phase difference between sampled adjacent horizontal sync signals.

3. The carrier generator according to claim 1, wherein said second phase variation amount signal is synchronized in phase with a color burst signal, and wherein said second phase variation amount signal represents a phase difference between sampled adjacent color subcarrier signals.

4. The carrier generator according to claim 1, wherein said integrator comprises:

a second adder for adding said added phase variation amount signal from said first adder to said phase value signal to produce a second added signal; and a latch receiving and latching said second added signal for supplying said phase value signal to said memory and to said second adder.

5. The carrier generator according to claim 4, wherein said memory stores a sine value table, and wherein said memory outputs a sine wave signal having a variable frequency responsive to size of said phase value signal.

6. The carrier generator according to claim 1, wherein said memory comprises a read only memory (ROM) storing a sine value table.

7. In a video tape recorder providing color signal frequency band conversion between a recorded color signal component and a reproduced color signal component, a carrier generator for generating a digital carrier signal comprising:

first means for combining first and second phase variation amount signals representing phase differences between sampled adjacent sync signals and sampled adjacent color subcarrier signals, respectively, to thereby produce an added phase variation amount signal;

second means for integrating said added phase variation amount signal to thereby generate a phase value signal; and third means receiving said phase value signal for providing the digital carrier signal;

wherein said first means is not included within said second means.

8. The carrier generator according to claim 1, wherein said second phase variation amount signal is phase synchronized with a color burst signal.

9. The carrier generator according to claim 7, wherein said second means comprises:

fourth means for combining said added phase variation amount signal from said first means to said phase value signal from said second means to thereby produce a combined signal; and fifth means receiving said combined signal for latching and supplying said combined signal to said third means and to said fourth means as said phase value signal.

10. The carrier generator according to claim 7, wherein said third means stores a sine value table, and wherein said third means outputs a sine wave signal having a variable frequency responsive to size of said phase value signal.

* * * * *